(No Model.)
I. A. McCASLIN.
HORSE DETACHER.
No. 491,807. Patented Feb. 14, 1893.
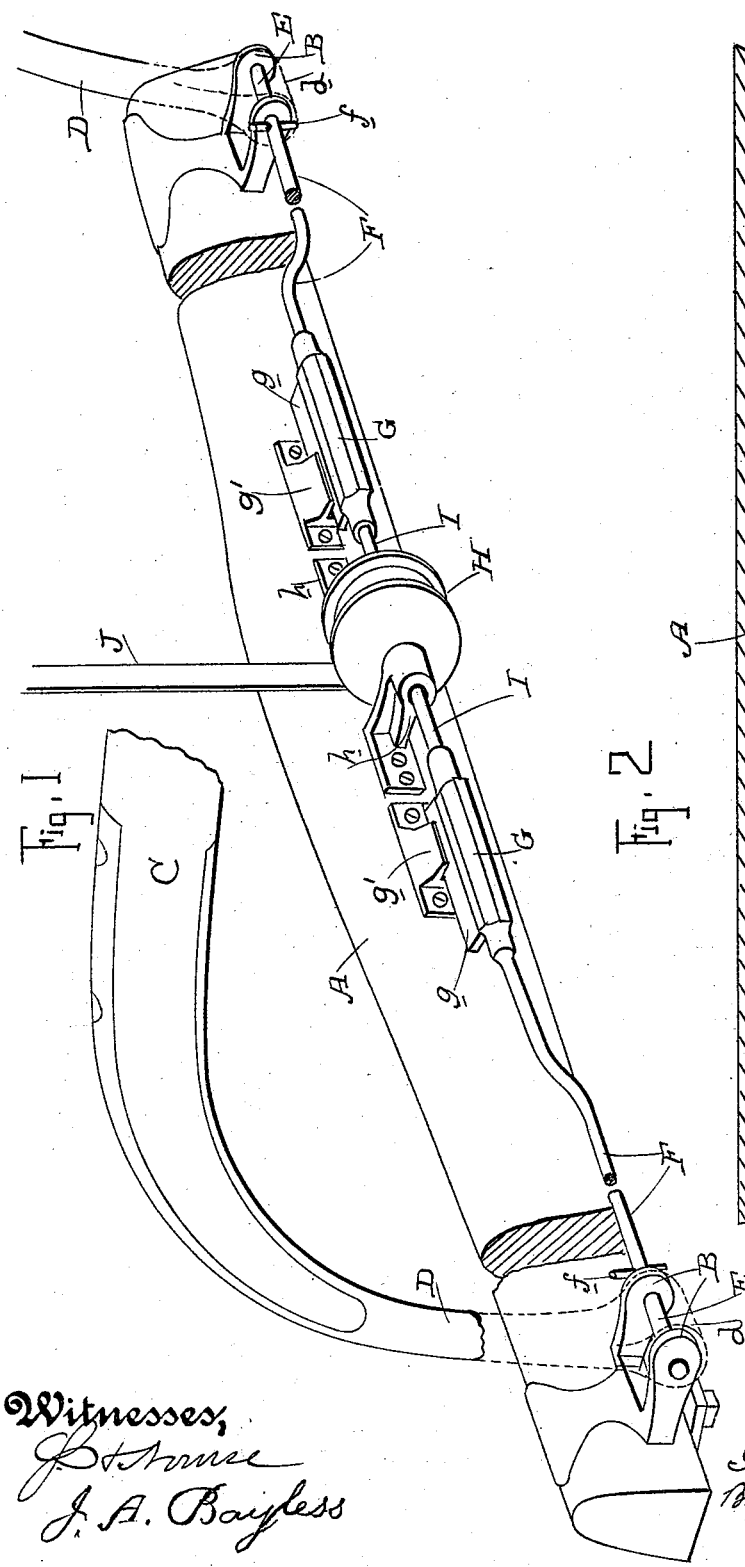
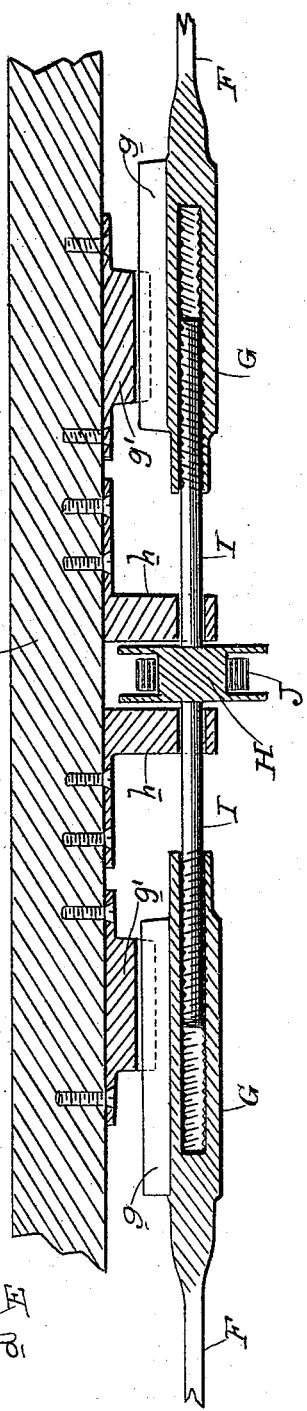
Witnesses,
J. A. Bayless
Inventor,
Irving A. McCaslin
by Dewey & Co.
Attys

UNITED STATES PATENT OFFICE.

IRVING A. McCASLIN, OF SANTA CLARA, CALIFORNIA, ASSIGNOR OF ONE-HALF TO JAMES A. ALLEN, OF SAME PLACE.

HORSE-DETACHER.

SPECIFICATION forming part of Letters Patent No. 491,807, dated February 14, 1893.

Application filed August 19, 1892. Serial No. 443,512. (No model.)

*To all whom it may concern:*

Be it known that I, IRVING A. MCCASLIN, a citizen of the United States, residing at Santa Clara, county of Santa Clara, State of California, have invented an Improvement in Horse-Detachers; and I hereby declare the following to be a full, clear, and exact description of the same.

My invention relates to that class of horse detachers in which the thill-coupling bolts are adapted to be withdrawn, to disconnect the shafts from the coupling clips, by means of a power device arranged at a point between the opposite bolts and adapted to be operated by suitable connections from the vehicle above.

My invention consists in the novel construction, arrangement and combination of of parts hereinafter fully described and specifically pointed out in the claim.

The object of my invention is to provide a simple, easily operated, powerful and durable device of this class.

Referring to the accompanying drawing for a more complete explanation of my invention,—A is the forward axle of a vehicle. Near each end of this axle are located the coupling clips B of the usual character.

C are the shafts having the irons D, the eyes $d$ of which fit between the clips and receive the thill-coupling bolts E whereby the shafts are connected to the axle. These bolts E are formed on or with the outer ends of rods F which extend toward the middle portion of the axle, their inner ends being formed or connected with slides G mounted by means of flanges $g$ in guide pieces $g'$ secured to the axle. The inner ends of these slides are tubular and are interiorly threaded as shown, whereby they form slide nuts.

Mounted in a suitable bearing $h$ on the middle front of the axle, is a drum H, the shaft I of which extends to each side and has its ends exteriorly threaded and fitting into the interiorly threaded slide nuts. The threads of the shaft ends, and those of the slide nuts on one side are the reverse of those on the other side, whereby as the shaft is rotated the slide nuts are drawn inwardly to approach each other or are forced outwardly away from each other. A suitable strap J is secured upon this drum, with a number of windings in its normal condition, and thence it extends upwardly into the vehicle, and in position to be grasped by the occupant. Suitable stops $f$ are mounted in the outer ends of the rods where the thill-coupling bolts join them, said stops limiting the outward movement of the bolts, while the sides of the center bearing $h$ of the drum, receiving the contact of the inner ends of the slide nuts, limit the withdrawal of said bolts.

The operation of the device is as follows: In the normal position the rods F are projected so that the thill-coupling bolts E are in place traversing the clips B and the eyes $d$ of the shaft irons D whereby the shafts are coupled to the axle. When it becomes necessary to detach the shafts from the axle, the strap J is pulled upwardly whereby the drum H is rotated and its screw shaft I operating in the slide nuts G draws said nuts inwardly toward each other, whereby through the rods F the thill-coupling bolts are withdrawn from the eyes of the shaft irons, thereby freeing the shafts and thus detaching the horse from the vehicle.

The construction here described is simple and economical and does not disfigure the vehicle. It is also very powerful, by reason of the application of the screw and nut, by which, no matter what may be the strain of the shafts on the coupling bolts, the latter can be easily withdrawn without the exercise of much power to turn the drum. The sliding nuts move easily in their grooved guides and being in substantially a direct line with the bolts, the pull is a straight one and there is no tendency to cramp.

Having thus described my invention, what I claim as new and desire to secure by Letters Patent is—

An improved horse detaching apparatus, consisting of the vehicle axle having end clips for the shafts, the central bearing and a drum mounted therein, the oppositely moving rods having straight outer ends formed into thill coupling bolts adapted to engage the shaft clips from their inner sides, the internally threaded slides G on the inner ends of the rods having flanges extending from them parallel with the axle, the slotted guide pieces $g'$ secured to said axle and receiving and guiding said flanges, the cross pins or stops $f$ in the outer ends of the rods adapted to come in contact with the shaft clips to limit the outward movement of the rods, and the shaft I mounted in the central bearing and having exteriorly-threaded outer ends adjustably fitted to the slides, all constructed and arranged to operate, as herein described.

In witness whereof I have hereunto set my hand.

IRVING A. McCASLIN.

Witnesses:
ETHAN H. SMITH,
I. S. THOMPSON.